(12) United States Patent
Heuft

(10) Patent No.: US 7,727,567 B2
(45) Date of Patent: Jun. 1, 2010

(54) METHOD OF ESTABLISHING THE INTEGRITY OF A PRODUCT LOCATED IN A CONTAINER

(75) Inventor: Bernhard Heuft, Burgbrohl (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 315 days.

(21) Appl. No.: 11/667,183

(22) PCT Filed: Nov. 7, 2005

(86) PCT No.: PCT/EP2005/055773
§ 371 (c)(1), (2), (4) Date: Aug. 6, 2007

(87) PCT Pub. No.: WO2006/048454
PCT Pub. Date: May 11, 2006

(65) Prior Publication Data
US 2008/0138475 A1    Jun. 12, 2008

(30) Foreign Application Priority Data
Nov. 5, 2004   (DE) ...................... 10 2004 053 567

(51) Int. Cl.
*G01N 33/14* (2006.01)
(52) U.S. Cl. .................. 426/232; 426/234; 426/238; 426/240; 426/397; 378/52
(58) Field of Classification Search .............. 250/357; 426/231–234, 238, 240, 392, 397; 99/337, 99/451; 378/52
See application file for complete search history.

(56) References Cited

U.S. PATENT DOCUMENTS

| 3,067,328 | A | * | 12/1962 | Harrison ..................... 426/231 |
| 3,078,710 | A | * | 2/1963 | Palmer .......................... 73/81 |
| 3,818,232 | A |   | 6/1974 | Kirkpatrick |
| 4,423,628 | A |   | 1/1984 | Richter |
| 4,980,294 | A | * | 12/1990 | Elias et al. .................... 436/21 |
| 5,735,167 | A | * | 4/1998 | Puukangas et al. ........ 73/304 C |
| 6,766,687 | B2 | * | 7/2004 | Florenz et al. ............ 73/304 C |
| 7,230,564 | B2 | * | 6/2007 | Basir et al. ..................... 342/22 |

(Continued)

FOREIGN PATENT DOCUMENTS

DE      2 211 594      3/1973

(Continued)

*Primary Examiner*—Drew E Becker
(74) *Attorney, Agent, or Firm*—Drinker Biddle & Reath LLP

(57) ABSTRACT

To establish the integrity of a product located in a container a given feature of the product in the container is determined by means of a first measurement method in which a first physical property of the product is ascertained, the given feature is additionally ascertained at least directly or by means of a second measurement method which is based on a second physical property which is different from the first physical property, and the values obtained by means of the two measurement methods of the given feature are compared. If the product is a drink in a bottle and if the given feature is the fill level, the first measurement method can consist of the fill level being measured by means of absorption of an X-ray beam, and the second measurement method can consist of the change effected by the bottle in the resonant frequency of a high-frequency oscillating circuit being measured.

4 Claims, 3 Drawing Sheets

U.S. PATENT DOCUMENTS

| | | | |
|---|---|---|---|
| 2005/0064076 A1* | 3/2005 | Mateos et al. | 426/231 |
| 2005/0287252 A1* | 12/2005 | Schrock et al. | 426/231 |
| 2006/0078658 A1* | 4/2006 | Owens et al. | 426/231 |
| 2006/0280848 A1* | 12/2006 | Westfall | 426/231 |

FOREIGN PATENT DOCUMENTS

| | | |
|---|---|---|
| DE | 24 10 110 A1 | 9/1975 |
| DE | 197 22 837 A1 | 12/1998 |
| GB | 2326232 A * | 12/1998 |
| WO | WO 98/21557 A1 | 5/1998 |
| WO | WO 99/01722 A1 | 1/1999 |
| WO | WO 99/56094 A1 | 11/1999 |

* cited by examiner

METHOD OF ESTABLISHING THE INTEGRITY OF A PRODUCT LOCATED IN A CONTAINER

CROSS-REFERENCE TO RELATED APPLICATIONS

This application is the U.S. national phase of the International Patent Application No. PCT/EP2005/055773 filed Nov. 7, 2005, which claims the benefit of German Application No. 10 2004 053 567.1 filed Nov. 5, 2004, the entire content of which is incorporated herein by reference.

FIELD OF THE INVENTION

The invention relates to a method of establishing the integrity of a product located in a container.

BACKGROUND OF THE INVENTION

In the case of products in containers, e.g., liquids in bottles or a powdered product in a can, several features are of interest. In the case of liquids in bottles, methods are known for measuring the fill level or the internal pressure. The fill level can be measured directly by means of a broad light beam and a plurality of optical sensors arranged vertically staggered. In addition there are also indirect measurement methods, e.g., by means of the absorption of X-rays or gamma rays or by means of the damping of a high-frequency oscillating circuit. When measuring the fill level by means of X-rays or gamma rays a measuring bridge, which has a radiator on one side of an opening and a radiation detector on the opposite side of the opening, is arranged on the path of the containers such that the nominal fill level lies approximately in the centre of the beam diameter. The beam can for example have a width of 2 cm. The extent of the absorption of the X-ray or gamma ray depends on the fill level as, with a higher fill level a greater proportion of the beam cross-section is absorbed by the product in the container, e.g., the liquid in the bottle. Thus, the lower the fill level the higher the beam output measured by the detector.

A substantial disturbance variable during this measurement arises because the absorption of the X-radiation depends substantially on the atomic weight of the elements contained in the molecules of the product. As a result, two different products show different absorption rates with the same fill level under otherwise identical conditions (same container, same temp. etc.). For example Diet Cola and classic Cola show a difference of approximately four percent in the absorption rate, which means that different threshold values must be entered in order to determine the fill level in order to obtain a uniform result.

In the case of the high-frequency measurement method, the damping due to the fill level is measured by means of a high-frequency oscillating circuit. The fill level substantially changes the capacitive part of the oscillating circuit, i.e., conductivity or dielectric constant and loss resistance, as properties of the contents or product greatly influence the measurement result alongside the fill level. Here too in the case of different products, e.g., two mineral waters with different salt contents, different threshold values must be entered to obtain an equivalent fill-level result.

A further method for determining the fill level of liquids in bottles is described in WO 98/21557, wherein here the result obtained depends on the pressure inside the bottle.

It is known from WO 99/56094 to ascertain the fill level of containers by generating mechanical oscillations in the container wall, by pulse-like deflection of the latter, and then analyzing the oscillations, wherein the decay time, the frequency, the intensity and/or the integral of the intensity or the site of the maximum intensity are recorded.

A further method for determining the fill level in containers is known from WO 99/01722, wherein here the fill level is determined by means of the heat radiation from the container.

The mass of a filled container can also be ascertained in another way, directly by weighing the container or indirectly by measuring the absorption of X-rays taking into account the capacity of the container.

The integrity of products is usually tested by means of chemical analyses. The integrity of the product, in particular of foods, can be destroyed unintentionally by errors in the production process or intentionally or maliciously.

BRIEF SUMMARY OF THE INVENTION

The object of the invention is to create a method of establishing the product integrity.

According to the invention this object is achieved by a method of establishing the integrity of a product located in a container, the method comprising the steps: ascertaining a given feature of the products by a first measurement method which is based on a first physical property of the product; ascertaining the given feature additionally by at least one of a direct measurement and a second measurement method which is based on a second physical property which is different from the first physical property; and comparing the values of the given feature obtained by means of the two measurement methods.

Typically the given feature is the fill level of the product in the container. The first measurement method can consist of the fill level being ascertained by means of X-radiation in the manner described above. The absorption of the X-radiation depends essentially on the atomic weight of the elements present in the molecules of the product. The result would therefore be distorted because in the examined product the atomic weights are distributed differently than in a reference product with which the measurement method was calibrated. By reference product is meant the safe or unadulterated product. The second measurement method can consist of the fill level being measured directly, e.g., by means of a light beam and optical sensors or a camera. The fill-level value ascertained by this method does not depend on the atomic weights of the elements in the product. The fill-level values which are obtained with both measurement methods are compared. If there is a difference, this indicates that the distribution of the atomic weights in the product does not correspond to the unadulterated product and that the examined product is not safe. The second measurement method can also be an indirect method, e.g., the ascertaining of the fill level mentioned above using a high frequency. This method must likewise be calibrated by means of a reference product. The measured fill-level value would be falsified if the examined product has a different conductivity or dielectric constant from the reference product. By comparing the fill-level value ascertained by this method with the value which was obtained by the X-ray measurement method, damage to the integrity of the product would be recognized if this changes the salt content of the product.

A further example is determining the mass of the product. The mass can be ascertained simply by absorption of the X-radiation in conjunction with an optical measurement of the fill level and taking into account the known bottle shape. The second measurement method can consist of determining the mass by weighing. If a different value for the mass of the product results in the two measurement methods, this indicates damage to the integrity of the product.

By ascertaining one and the same product feature by means of two different measurement methods and by comparing or correlating the measurement results, damage to the integrity of the product can thus be established. In the above-mentioned example of ascertaining the fill levels by means of X-rays and high frequency, by correlating the measurement results conductivity, dielectric constant, density or chemical composition can be meaningfully used to establish deviations from the original product composition. These physical properties have thus far been seen merely as disturbance variables. Starting from the fact that the two measured fill levels must agree, deviations of product-specific parameters can be very well established with this simultaneous measurement. If the threshold values are fixed accordingly individual containers with substantially deviating product contents can thus also be recognized and diverted. Via averaging, because of the high production figures (the capacity of modern bottle-filling plants today is around 60,000 bottles per hour) an outstanding statistical precision is very quickly achieved; the essential basic aspect of the invention, the detection of changes in the packed product in sealed and already secured containers, whether caused by a production fault or by intent, as a potential threat to a broader group of buyers is thereby already ensured.

A particular advantage of the invention is that the integrity of the product in the sealed container can be established. The integrity of the contents of drinks bottles can thus be tested with the closure attached. The test can then be checked at the end of the manufacturing process.

Radioactive contaminations which radiate in the 60 KeV energy range—this is the energy range in which the X-ray measurement method operates—can incidentally also be well recognized via an increase of the average.

A further embodiment includes an additional measurement of the X-ray absorption in the lower part of the container with the result that deviations in the chemical composition due to the mass values of the atoms can be recognized, uninfluenced by the fill level, and thus a clear determination of the causative parameter is made possible. The additional measurement naturally also increases the measurement precision of the whole device. It is likewise also possible, again in the lower part section of the container, to determine the conductivity of the product by means of a high-frequency transmit and receive device, and thus achieve clarity.

Another embodiment example of the invention consists of ascertaining the internal pressure of the container by means of two different measurement methods, in one case by means of the ultrasound method described in WO 98/21557 and in the other by a mechanical pressure test in which PET bottles are squashed by means of two laterally gripping belt conveyors and it is ascertained, via two fill-level checks, what the fill level in the PET bottle is when it is squashed and not squashed, wherein at the runout of the belt conveyor the internal pressure reached in the PET bottles is measured by means of a load cell. The change in the fill level is a measure of the pressure prevailing in the bottle. The pressure value ascertained with the ultrasound method is influenced by the composition of the gas in the headspace of the container, while the pressure value ascertained by the mechanical method is not affected by it.

It can simultaneously be established by the mechanical pressure test whether or not the PET bottle is leaking. To further refine the integrity check the mechanical pressure test can also be combined with the measurement of the fill level, in particular in products which after the filling and sealing of the containers can build up pressure at different speeds, e.g., depending on the $CO_2$ content.

Additionally, by means of a camera, e.g., CCD camera, or the above-mentioned ultrasound method, the foaming behavior of the product after filling can be established and quantified. The result can be correlated with the other measurements and incorporated into an overall image.

DETAILED DESCRIPTION OF THE INVENTION

Figure 1:
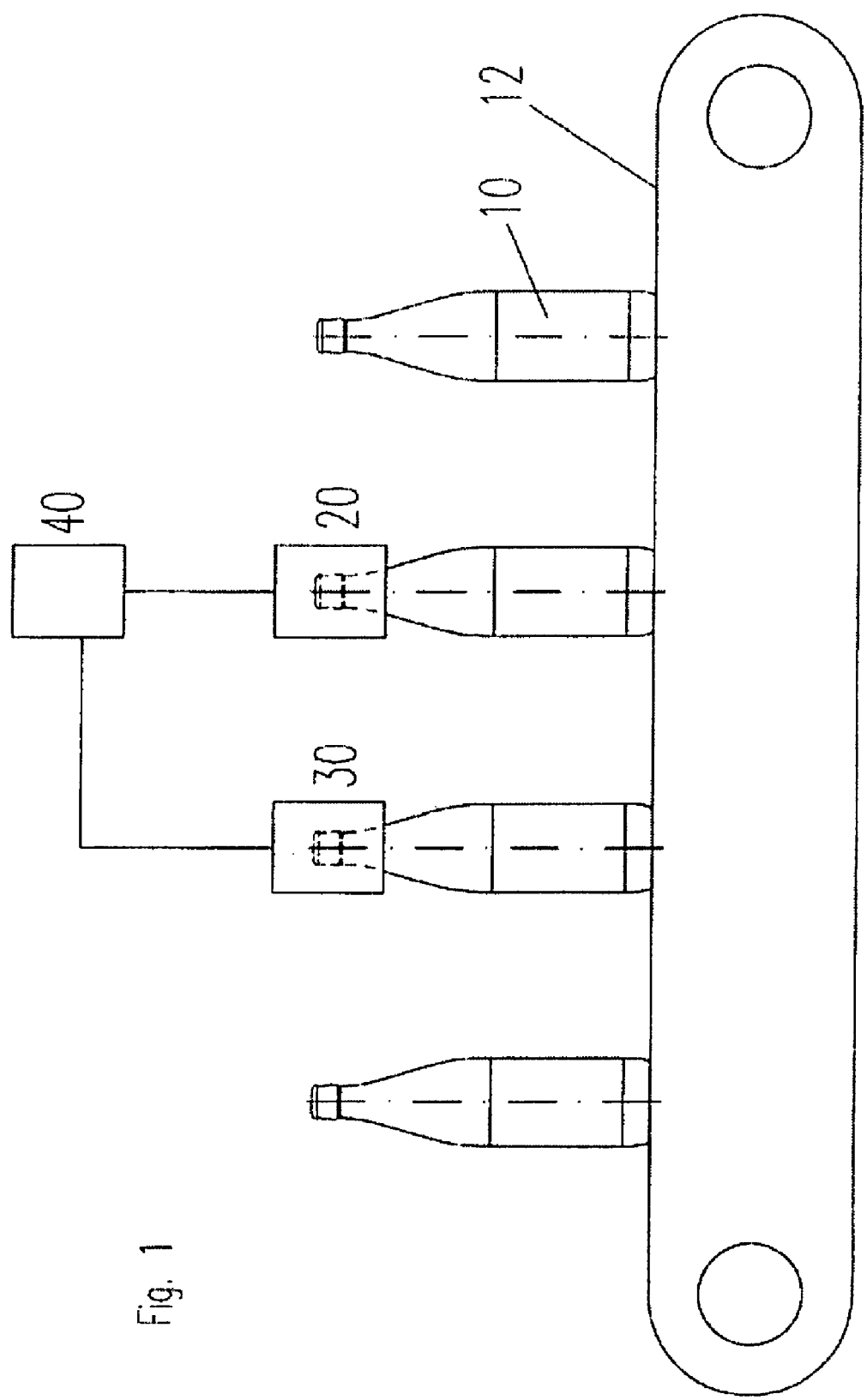
FIG. 1 in a schematic representation of a unit for checking integrity of a product via the fill-level measurement.

A unit for carrying out the method according to the invention is schematically represented in the drawing, wherein the fill level in drinks bottles 10 is measured by means of X-rays and by means of high frequency and the measured values are compared with each other.

As shown in FIG. 1, the bottles 10 are moved on a conveyor 12, e.g., a link-chain belt, firstly through a first inspection station 20 in which the fill level is measured by means of X-rays. Thereafter they are moved through a second inspection station 30 which is arranged a short distance behind the first inspection station 20 and in which the fill level is measured by means of high frequency. The values ascertained according to the two different measurement methods for the fill level are compared with each other in a control device 40. If the difference between the two measured values exceeds a specific threshold value, this is seen as an indication of damage to the integrity of the product e.g., drink contained in the bottles 10, and the affected bottle is removed from the further course of manufacture or the whole unit is stopped in order to investigate the possible damage to the integrity of the drink contained in the bottles 10.

Figure 2:
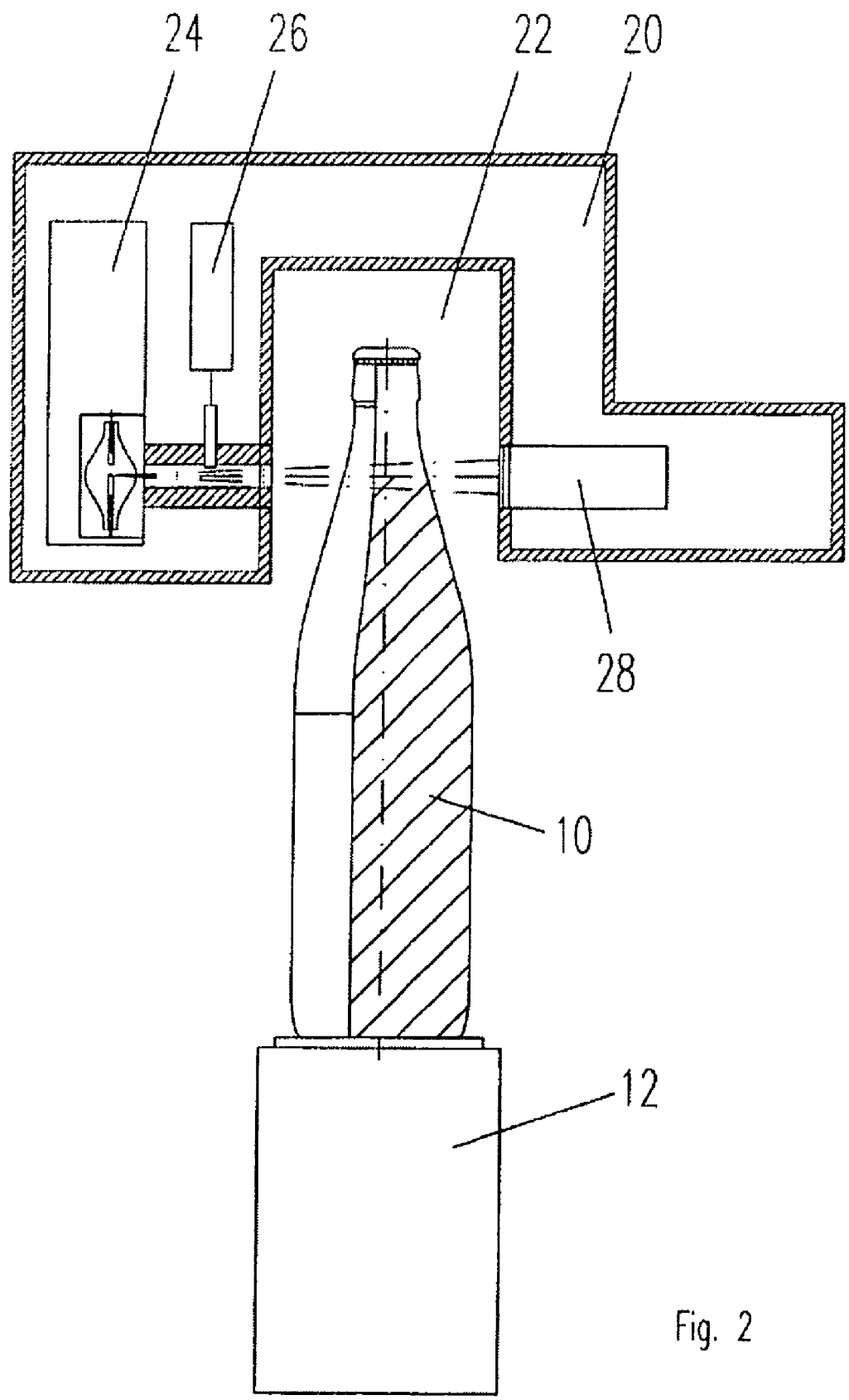
FIG. 2 a sectional view of a device for measuring the fill level of a container by means of X-rays.

FIG. 2 shows in section seen in the direction of the transporter or conveyor 12 the essential elements of the inspection station 20 for measuring the fill level of the product in the bottles 10 by means of X-ray absorption. The inspection station as a whole 20 has the shape of a bridge with an aperture 22 which houses approximately the top quarter of the drinks bottle 10. An X-ray tube 24 and a movable shutter 26 are arranged on one side of the aperture 22 an. An X-ray detector 28 is arranged on the opposite side of the aperture 22. The beams produced by the X-ray tube 24 are directed onto the X-ray detector 28. This measuring bridge is arranged at a height above the transporter 12 such that the nominal fill level is located approximately in the centre of the width of the X-ray beam.

The measurement principle is that in the case of a fill level which is above the nominal fill level a greater proportion of the X-ray beam runs through the product, i.e. the drink, and is absorbed, with the result that the X-ray detector 28 measures a lower radiation intensity. Conversely, in the case of a low fill level, a higher radiation intensity is measured.

Figure 3:
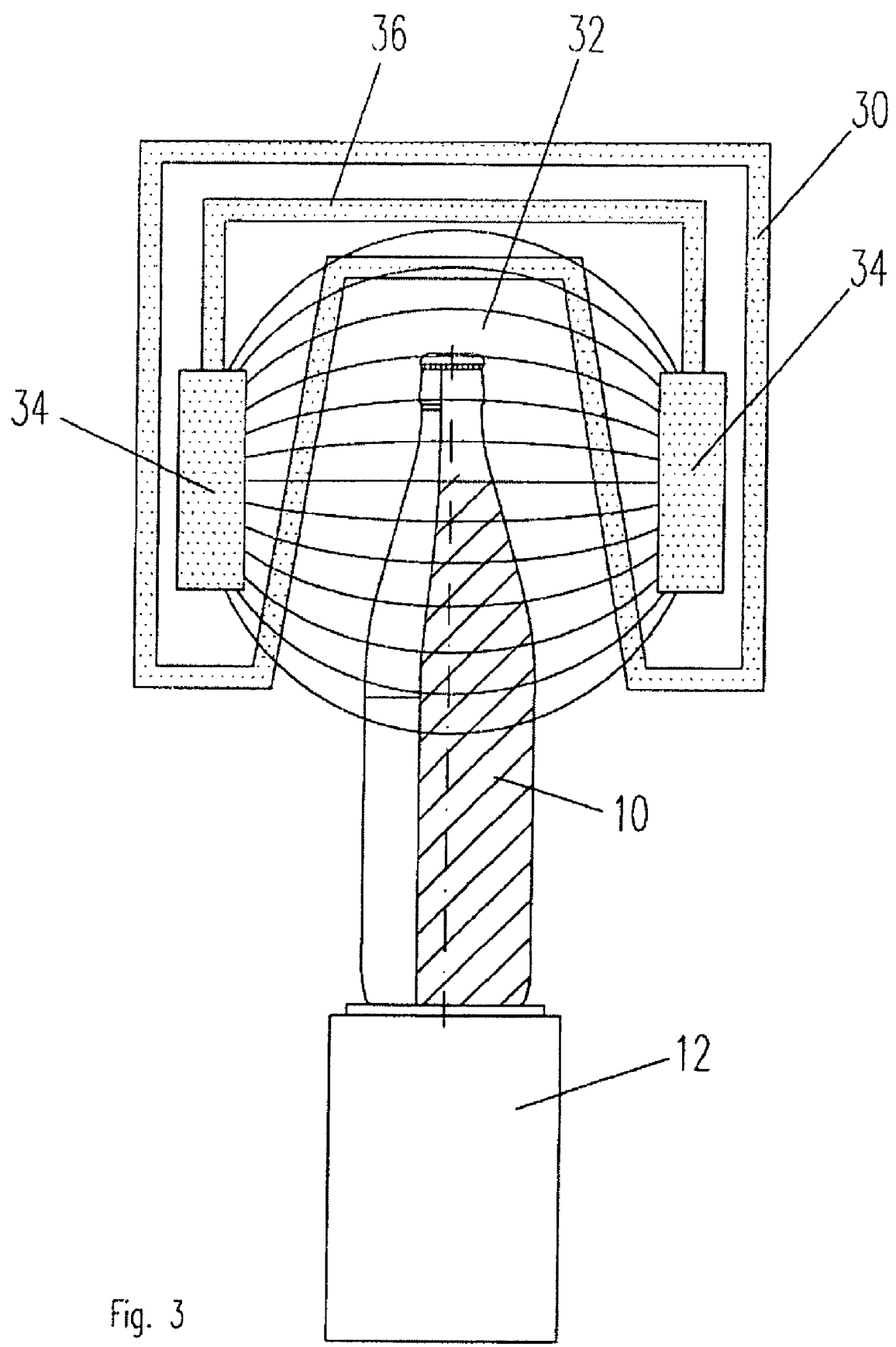
FIG. 3 a sectional view of a device for measuring the fill level of a container by means of high frequency.

In FIG. 3, again seen in the direction of transport, the second inspection station 30 is represented in which the fill level is measured by means of high frequency. The measurement head again has the shape of a bridge with an aperture 32. Located on both sides of the aperture 32 are capacitor plates 34 which are part of an oscillating circuit 36.

The measurement principle is that the resonant frequency of the oscillating circuit 36 depends on the dielectric constant of the material between the capacitor plates 34. When passing through a bottle the capacity of the capacitor formed by the two capacitor plates 34 is determined by the proportion of the different materials and their dielectric constants. As liquids have a higher dielectric constant than air, the resonant frequency of the oscillating circuit 36 is influenced by the fill level of the liquid in the bottle 10. The higher the fill level, the higher the effective permittivity of free space between the capacitor plates 34, whereby the capacity of the capacitor is increased, which results in a reduction in the oscillating frequency.

As both measurement methods measure the fill level indirectly, namely via the absorption of the X-radiation or by changing the resonant frequency, both inspection stations 20, 30 must be calibrated before the start of the integrity check by means of one or more bottles, with a predefined, correct fill level and unadulterated contents.

The absorption of the X-rays in matter depends on the atomic number of the elements. The radiation intensity measured by the detector 28 therefore then gives the proper fill level only if the drink inside a checked bottle 10 corresponds in the composition of its elements to the drink in the reference bottle by means of which the inspection station 20 was calibrated. The same applies to the second inspection station 30 with regard to the dielectric constant of the drink in the bottle 10. The integrity of the product, i.e. drink, in the bottle 10 can be checked by comparing the measurement values of both inspection stations 20, 30 in a control device 40. If both inspection stations 20, 30 show apparently different fill levels this means that either the atomic weight of the elements of the product, i.e. of the drink, or its dielectric constant, or both parameters deviate from the nominal value and thus the product in the bottle 10 concerned does not conform to requirements.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

The invention claimed is:

1. A method of establishing the integrity of a product located in a container, comprising the steps:
    ascertaining a first value for a given feature of the product by a first measurement method which is based on a first physical property of the product;
    ascertaining a second value for the given feature by at least one of a direct measurement and a second measurement method, the second measurement method based on a second physical property which is different from the first physical property;
    comparing the first and second values of the given feature obtained by means of the two measurement methods;
    comparing a difference between the first and second measured values of the given feature with a threshold value wherein it is seen as an indication of damage of the integrity of the product if the difference between the first and second measured values of the given feature exceeds the threshold value.

2. The method according to claim 1, comprising the additional step of measuring the absorption by the product by means of X-radiation in an area clearly below the fill level of the bottle.

3. The method according to claim 1, wherein average values of the given feature of a plurality of products which have been ascertained with the first measurement method and the average values of this feature which have been ascertained with the second measurement method are compared with each other.

4. The method according to claim 1, comprising the additional step of determining the change of the dielectric constant of the product by means of the high frequency oscillating circuit and wherein the product is a drink in a bottle and the given feature is a fill level and wherein the first measurement method includes measuring the fill level by means of absorption of an X-ray beam and the second measurement method includes measuring the change effected by the bottle in the resonant frequency of a high-frequency oscillating circuit.

* * * * *

UNITED STATES PATENT AND TRADEMARK OFFICE
CERTIFICATE OF CORRECTION

PATENT NO.       : 7,727,567 B2
APPLICATION NO.  : 11/667183
DATED            : June 1, 2010
INVENTOR(S)      : Heuft It is certified that error appears in the above-identified patent and that said Letters Patent is hereby corrected as shown below:

IN THE CLAIMS:

In Claim 1, Column 6, line 31, after "the threshold value" insert --; and wherein the product is a drink in a bottle and the given feature is a fill level and wherein the first measurement method includes measuring the fill level by means of absorption of an X-ray beam and the second measurement method includes measuring the change effected by the bottle in the resonant frequency of a high-frequency oscillating circuit--.

In Claim 4, Column 6, line 45, after "circuit" delete "and wherein the product is a drink in a bottle and the given feature is a fill level and wherein the first measurement method includes measuring the fill level by means of absorption of an X-ray beam and the second measurement method includes measuring the change effected by the bottle in the resonant frequency of a high-frequency oscillating circuit".

Signed and Sealed this

Twenty-first Day of December, 2010

David J. Kappos
*Director of the United States Patent and Trademark Office*